E. P. CONWAY.
CUSHION TIRE.
APPLICATION FILED SEPT. 26, 1916.
1,217,568. Patented Feb. 27, 1917.
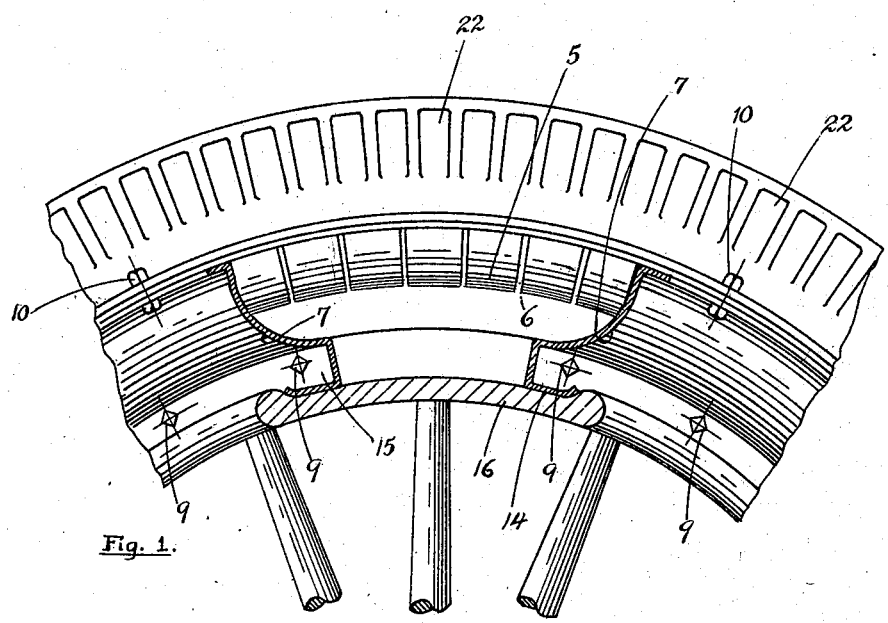
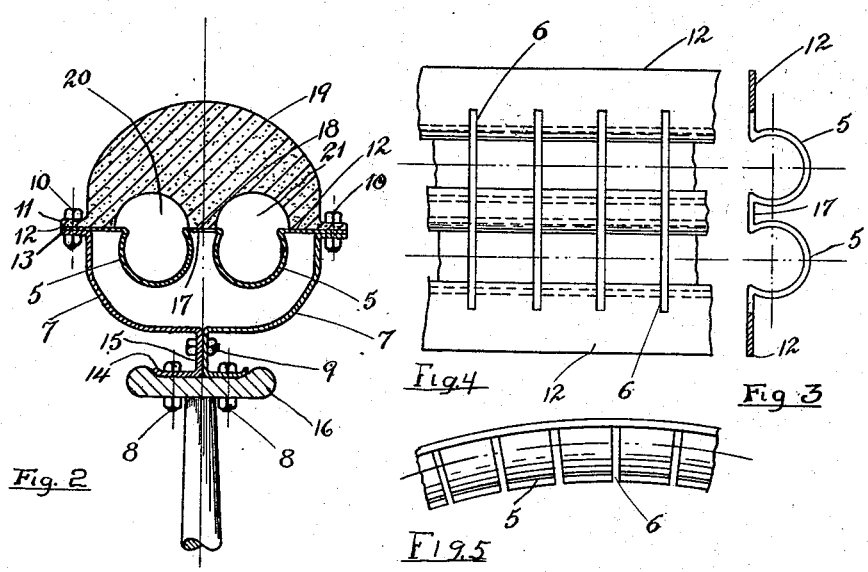
Witnesses.
Edward J. Sharkey
Inventor
Edward P. Conway

UNITED STATES PATENT OFFICE.

EDWARD P. CONWAY, OF WATERBURY, CONNECTICUT.

CUSHION-TIRE.

1,217,568.   Specification of Letters Patent.   Patented Feb. 27, 1917.

Application filed September 26, 1916. Serial No. 122,259.

*To all whom it may concern:*

Be it known that I, EDWARD P. CONWAY, a citizen of the United States, and resident of Waterbury, in the county of New Haven, State of Connecticut, have invented new and useful Improvements in Cushion-Tires, of which the following is a specification.

My invention relates to new and useful improvements in cushion tires for all vehicles and especially automobile tires.

It is the object of the invention to provide a cushion tire for the above purpose which in appearance will resemble the ordinary pneumatic tire, and be adapted for use upon wheels similar to those now commonly manufactured for automobiles; to provide a tire which in effect and operation will be somewhat like the common forms of pneumatic tires now upon the market, but be free from the usual annoyance and inconvenience caused by punctures, blowouts and other troubles commonly experienced with the inflated types of tires; further to provide a tire which will be comparatively inexpensive to manufacture and perfectly durable and practical in every respect; and finally to construct it in a way which will permit of its attachment and detachment to a wheel conveniently and quickly and to form a dust-proof construction.

With the above objects in view my invention resides and consists in the novel construction and combination of parts shown upon the accompanying sheet of drawing forming a part of this specification upon which similar characters of reference denote like or corresponding parts throughout the several figures and of which:

Figure 1 is a side elevation partly in section of a fragment of a wheel showing my improved tire associated therewith.

Fig. 2 is a cross sectional view of the same.

Fig. 3 is a cross sectional view of the resilient tread supporting member.

Fig. 4 is a top plan view of the same and Fig. 5 is an edge view of the same.

In carrying out my invention, I employ a rim formed in two sections and each comprising a base flange 14 adapted to be secured to a wheel felly 16, outwardly projecting webs 15 which are adapted to be clamped together by bolts 9, and outwardly curved sides 7 terminating in outwardly extending flanges 13, the two outwardly curved sides forming a substantially semicircular rim. Resting upon the flanges of the rim is a spring plate 12 formed on each side of the center with inwardly projecting, rounded ribs 5—5, leaving a central bearing 17 between them. This plate is formed at intervals with transverse slots 6 which divide the ribs 5—5 and central bearing portion 17 into a series of spring members. A tread 19 formed from rubber or other suitable material, is substantially semicircular in form, and has flanges 11 on opposite sides which are connected to the flanges 13 of the rim by bolts 10 which also extend through the sides of the spring plate 12 so that the tread, plate and rim are connected together. The inner face of the tread is formed on opposite sides of the center with semicircular grooves 20 and 21 slightly wider than the width of the ribs 5—5 leaving a central foot 18 which rests upon the central portion 17 of the plate. The surface of the tread may be provided with anti-skid projections 22, if desired. In action under the weight of the car the spring members of the plate will yield slightly, as well as the tire, so that a sufficient cushioning effect will be provided. The rim members and spring plate are readily formed from sheet metal, the ribs in the spring plate 12 and the slots being formed while the plate is a straight strip after which it is bowed.

It will be apparent, without illustration, that the rim members and plate may each be formed from a continuous strip, or they be made of sections as may be deemed most convenient in manufacture.

I claim:—

1. A tire for vehicle wheels comprising two rim members adapted to be secured to a wheel felly, a spring plate resting upon the edges of the rim members, said plate formed with inwardly projecting rounded ribs and transversely slotted, combined with a tread member resting upon said plate and with it secured to the said rim.

2. A tire for vehicle wheels comprising two rim members adapted to be secured to a wheel felly, said rim members formed upon their outer edges with outwardly projecting flanges, a spring plate resting on said flanges, said spring plate formed with two parallel inwardly projecting rounded ribs, combined with a tread member formed with two parallel grooves, said tread member also formed with flanges resting upon the said spring plate and with it secured to the flanges of the rim members.

3. A tire for vehicle wheels comprising two rim members each formed with flanges adapted to be secured to a wheel felly, with outwardly projecting webs adapted to be connected together, said rim members being outwardly bowed and formed at their outer edges with flanges, a spring plate resting upon said flanges, said spring plate formed on opposite sides of the center with inwardly projecting rounded ribs, the said plate formed at intervals with slots cutting through the ribs and central portion of the plate, combined with a tread formed on opposite sides of the center with grooves, the central portion of the tread resting upon the central portion of the plate, said tread also formed on opposite sides with outwardly projecting flanges resting upon said plate and secured to the flanges of the rim members.

In testimony whereof I affix my signature in presence of two witnesses.

EDWARD P. CONWAY.

Witnesses:
GEORGE H. HYNIS,
SADIE K. NYNES.

Copies of this patent may be obtained for five cents each, by addressing the "Commissioner of Patents, Washington, D. C."